United States Patent [19]
Christensen, James L.

[11] 3,981,013
[45] Sept. 14, 1976

[54] NON-JAMMABLE PLURAL FREQUENCY RADAR SYSTEM

[75] Inventor: Christensen, James L., Beverly, N.J.

[73] Assignee: The United States of America as represented by the Secretary of the Navy, Washington, D.C.

[22] Filed: Aug. 31, 1966

[21] Appl. No.: 576,782

[52] U.S. Cl. .......................... 343/17.1 R; 343/18 E
[51] Int. Cl.² ........................................... G01S 7/36
[58] Field of Search ............. 343/5 R, 17.1 R, 18 E

[56] References Cited
UNITED STATES PATENTS

| | | | |
|---|---|---|---|
| 3,082,418 | 3/1963 | Milosevic | 343/17.1 X |
| 3,302,161 | 1/1967 | Ellison | 343/17.1 X |

*Primary Examiner*—T.H. Tubbesing
*Attorney, Agent, or Firm*—G. J. Rubens; Henry Hansen

[57] ABSTRACT

A radar system for transmitting and receiving a plurality of signals of different frequency simultaneously to prevent the possibility of jamming the system. Two signals of different frequency are produced comprising the upper and lower sidebands of a carrier frequency. These signals are simultaneously radiated and upon reflection are received in two receiver channels centered on frequencies identical with the transmitted frequencies. The received signals are then mixed to produce an intermediate frequency which is again mixed with a local oscillator signal whereupon range and tracking information may be derived.

8 Claims, 1 Drawing Figure

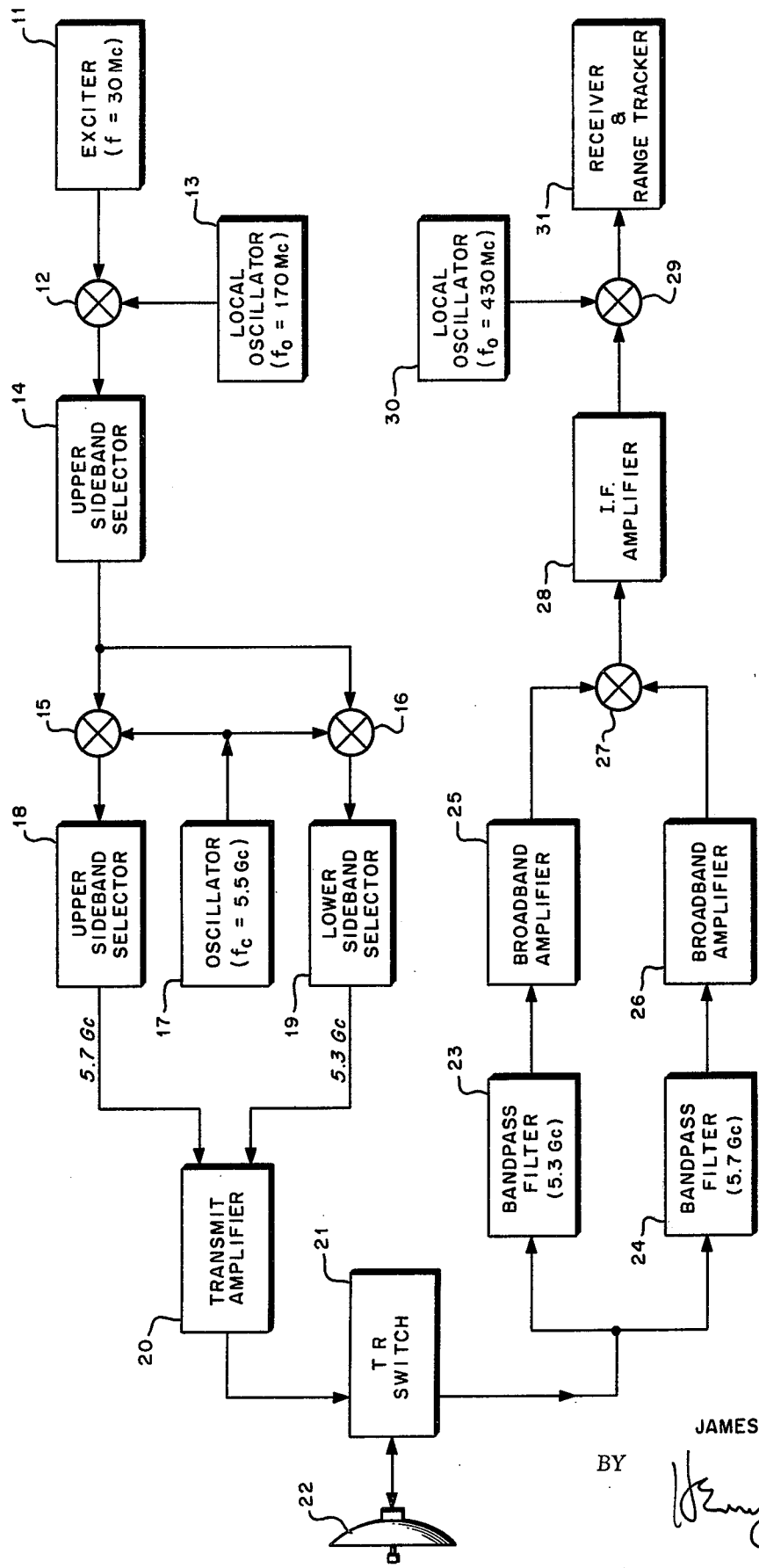

NON-JAMMABLE PLURAL FREQUENCY RADAR SYSTEM

The present invention relates to radar systems and more particularly to a radar system for preventing jamming signals from saturating the circuits of a radar receiver.

Target range information can be denied a radar receiving system by filling up its time base with interference pulses from a jammer. This may be accomplished by sweeping a jamming signal through the frequency of a receiver at a rate equal to the receiver bandwidth. Carcinotron type jammers consisting of a swept-frequency backward wave oscillator have been found to be capable of jamming many radar receivers. For example, if a radar receiver has a one MC bandwidth, a fast swept jammer sweeping through the radar carrier frequency will generate a one microsecond pulse in the receiver on each pass. If the modulation frequency of the jammer is between 500 kc and 1 megacycle, the signal received by the radar receiver will be of such a magnitude as to cause complete saturation of the receiver circuitry throughout the time base. Accordingly, the effectiveness of a receiver to determine range information in such an environment is considerably reduced if not comletely eliminated.

The general purpose of the present invention is therefore to provide a radar system immune from such jamming signals without sacrificing system performance in the presence of either swept-frequency jammers or spot jammers. To effecively counter this type of jammming, the present invention contemplates transmitting two pulses simultaneously on two different carrier frequencies and receiving the two echo pulses in two receiver channels centered on the two different carrier frequencies. The two received pulses are then mixed to produce an intermediate frequency which may then be processed in a conventional manner and range tracking information derived therefrom. Since a single swept-frequency jammer cannot be in both receiver channels simultaneously, a difference frequency cannot be obtained and therefore no signal will pass into the receiver, thereby preventing saturation of the receiver circuitry.

An object of the present invention is therefore to provide a radar system for overcoming the effects of jamming signals on a radar receiver.

Another object of the invention is to provide a radar system for simultaneously transmitting and receiving plural pulses of different frequency by which jamming signals are prevented from passing to the receiver and in which radar system performance is not degraded by such jamming.

Still another object of the invention is to prevent a fast swept jammer from filling up the time base of a radar system and causing saturation of the receiver circuits so that target range information can still be obtained.

Other objects and many of the attendant advantages of this invention will be readily appreciated as the same becomes better understood by reference to the following detailed description when considered in connection with the accompanying drawing in which the FIGURE is a block diagram of an embodiment of the invention.

Referring now to the drawing, there is shown an exciter 11 for generating RF pulses of variable pulse width for application to one input of an RF mixer 12. Typical mixers which may be employed are described in Principles of Radar, 3rd ed. by REINTJES and COATE at pages 441 through 452, inclusive. The second input to the mixer is supplied from a local oscillator 13 which provides a signal having a frequency and amplitude sufficient to produce an output equal to the sum and difference of the two input frequency signals. In the particular embodiment disclosed herein, the sum of the two signals is of interest and accordingly the output is coupled to an upper sideband selector 14, for example, a high pass filter, which passes the sum frequency with minimum attenuation and provides maximum attenuation for the difference frequency. By this means then, the output of the selector 14 will contain signals of only the sum frequency. For example, assume that the output of the exciter is a pulsed 30 megacycle signal and that the frequency of the local oscillator 13 is 170 megacycles (pulsed or Cw). Then the output of the selector 14 would be the sum of these two frequencies or pulsed 200 megacycles.

The output of the selector 14 is then coupled to the inputs of two mixers 15 and 16 where the input signals are combined with the output of a carrier frequency oscillator 17 for producing outputs equal to the sum and difference of the combined oscillator frequency and input signal. If the oscillator frequency is 5.5 kilomegacycles (Gc) and the input signal is 200 megacycles, as previously illustrated, the outputs from the mixers 15 and 16 will each contain signals of 5.3 Gc and 5.7 Gc. Since it is desired to separate these two signals, an upper sideband selector 18 is coupled to the mixer 15, and in a manner similar to the selector 14, passes only the 5.7 Gc signal. Connected to the output of the mixer 16 is a lower sideband selector 19 which passes only the 5.3 Gc signal. Accordingly, by use of the upper and lower sideband selectors 18 and 19, respectively, the sum and difference frequencies from the mixers 15 and 16 are separated. Since the two signals originated from a single pulse generated by the exciter 11, the pulses appearing at the output of the selectors 18 and 19 are simultaneous in time.

These two signals are coupled to a transmit amplifier 20, illustrated as a single amplifier which combines and amplifies the signals; however, it may be a dual amplifier in which each signal is amplified separately and then combined in a power combiner, such as a hybrid junction as described in the above referenced text at pages 825 through 834 inclusive. The function of the transmitter amplifier 20 is to combine the two signals into one for simultaneous transmission while still maintaining their separate frequency identity. Techniques for accomplishing this are well known to those skilled in the art and accordingly will not be described herein in any greater detail.

The output of the transmitter amplifier 20 is then coupled to a transmit-receive (TR) switch 21 for coupling the simultaneously occurring signals to a radar antenna 22 for illumination of a selected target. The TR switch 21 may typically be a microwave TR tube, a half-wavelength coaxial-line resonator or a wave guide TR switching system. These devices are fully described in the above text on pages 857 through 871 and accordingly need no further explanation.

The reflected waves or echo signals emitted from the target are received by the antenna 22 and coupled through the TR switch 21 to the receiver portion of the radar system. Since two simultaneous pulses were transmitted, two simultaneous echos will be received by the receiver, each having frequency characteristics similar to those transmitted by the transmitter. These signals are applied to two bandpass filters 23 and 24, each having a center frequency centered about the different transmit frequencies. For example, filter 23 may have a center frequency of 5.3 Gc and a bandwidth of 50 megacycles and filter 24, a center frequency of 5.7 Gc and a bandwidth of 50 megacycles. In this way, the received signals are separated and applied to broadband amplifiers 25 and 26 where the signals are amplified. While the bandpass filter and broadband amplifier have been illustrated as individual elements, it is to be understood that a bandpass amplifier having similar response characteristics could be equally well employed without departing from the spirit and scope of the present invention.

The outputs of the broadband amplifiers 25 and 26 are coupled to the inputs of a mixer 27, the function of which is to provide an output signal of an intermediate frequency (IF) equal to the difference between the two input signals. For the particular frequencies selected herein, with input signals of 5.3 and 5.7 Gc, the output frequency of the mixer 27 will be 400 megacycles. This signal is applied to an IF amplifier 28 where the signal is amplified and narrowbanded if desired. For example, the amplifier may have a bandwidth of 1 megacycle at this intermediate frequency. The amplified signal is then applied to a mixer 29 where it is heterodyned with a signal from a local oscillator 30. The output of the mixer 29 is then applied to a receiver and range tracker 31 for determining target range information. The frequency of the local oscillator 30 is selected in accordance with the particular capabilities of the receiver and range tracker 31. For example, if the receiver and range tracker 31 has a 30 megacycle intermediate frequency of operation, then the local oscillator frequency may be 430 megacycles. In the mixer 29, the 400 megacycle signal from the IF amplifier 28 and the 430 megacycle signal from the local oscillator 30 are mixed to produce an output of 30 megacycles.

Having thus described each of the elements and their interconnections, the operation of the system will now be described in a non-jamming environment. Assume that a 30 megacycle RF pulse having a 1 microsecond duration and a 1 megacycle bandwidth is generated in the exciter 11. This pulse is coupled to the mixer 12 where it is combined with a local oscillator having a 170 megacycle frequency; the output thereof is coupled to the upper sideband selector 14 which provides a 200 megacycle pulsed output. This signal is then mixed with the 5.5 Gc oscillator frequency and produces outputs from the upper and lower sideband selectors 18 and 19 of 5.7 and 5.3 Gc, respectively. These pulses are amplified and transmitted through the TR switch 21 to the antenna 22 where the amplified pulses are radiated to a target. The two signals being transmitted simultaneously will also produce simultaneous echo return signals which are then passed from the antenna through the TR switch 21 to the bandpass filters 23 and 24 where discrete signal frequencies (5.3 and 5.7 Gc) are selected from the return echo. After selection, the signals are passed through broadband amplifiers 25 and 26 and then mixed in the mixer 27, the output of which is amplified by the IF amplifier 28 and then heterodyned with another local oscillator 30 to provide a signal for the receiver and range tracker 31 at its frequency of operation so that target range information can be obtained.

Considering now the operation of the system in a jamming environment, assume that a fast swept jammer is sweeping through the radar carrier frequency (i.e., 5.0 Gc to 6.0 Gc) at a 500 kc to 1 mc sweep modulation frequency. As the jammer sweeps through the 5.3 and 5.7 Gc frequency, sequential pulse signals having a repetition frequency proportional to the modulation frequency of the jammer will appear at the outputs of the bandpass filters 23 and 24. However, since the jammer is of a swept-frequency type, it cannot be in both channels simultaneously, therefore a 400 megacycle intermediate frequency cannot be produced at the output of the mixer 27; accordingly, the IF amplifier 28 cannot be saturated by the jamming signal. If the jamming signal appears in one channel at the same time as an echo return, it will act as a random phase local oscillator to the pulse in the other channel and have little or no effect thereon; the target returns will continue to produce an IF frequency even in the presence of the jamming signal and hence range tracking will still be maintained.

Even if the jammer changes the mode of operation from the swept-frequency method to the spot jamming method, the radar receiver will still be able to maintain range track of a target since the jamming signal will again appear only as a random phase local oscillator to the signal in the other channel, having no effect on the range tracking information.

In the particular example illustrated herein, for a swept frequency jammer to be effective in degrading range tracking, the jammer must sweep a 400-megacycle bandwidth at a 50-megacycle rate. The bandwidth being determined by the frequency difference of the two carriers and the frequency rate being determined by the bandwidth of the bandpass filters 23 and 24. Since it is very difficult to operate jammers at this repetition rate and over this bandwidth, the above illustrated radar system will provide effective countermeasures in most jamming environments.

In addition to obviating the aforementioned jamming environment, the present radar system also renders a barrage noise jamming system ineffective so long as the bandwidth of the jammer is less than the channel separation, i.e., 400 megacycles in the foregoing illustration.

In summary then, there is disclosed herein a novel radar system providing effective electronic countercountermeasures in a jamming environment by simultaneously transmitting plural pulses of different frequency and creating a receiver intermediate frequency only in the presence of simultaneously receiving plural pulse returns.

Various modifications are contemplated and may obviously be resorted to by those skilled in the art without departing from the spirit and scope of the invention, as hereinafter defined by the appended claims, as only an embodiment thereof has been disclosed.

What is claimed is:

1. A radar system comprising:
a first oscillator providing a first carrier frequency;
means for deriving from said first carrier frequency simultaneous signals of different frequency respectively comprising upper and lower sideband signals of said first carrier frequency;
a first selector means receiving said sideband signals and providing an output signal at only one of said different frequencies;

a second oscillator providing a second carrier frequency;

means combining said output signal wih said second carrier frequency for producing a plurality of signals of different frequency to be simultaneously radiated, which signals comprise upper and lower sidebands of said second carrier frequency;

means simultaneously radiating said upper and lower sidebands of said second carrier frequency; and means receiving said second carrier frequency upper and lower sideband signals after reflection from reflecting objects and providing range information about said objects only in the presence of simultaneous signal reflections.

2. A radar system as recited in claim 1 wherein said means for deriving simultaneous signals from said first carrier frequency comprises:

a source of signals; and mixer means for mixing the output of said first oscillator and said source of signals.

3. A radar system as recited in claim 1 wherein said means receiving said second carrier frequency upper and lower sideband signals comprises:

means providing an intermediate frequency signal only in the presence of said simultaneous second carrier frequency upper and lower sideband signal reflections; and means for applying said intermediate frequency signal to a receiver and range tracker for providing range information about said object.

4. A radar system as recited in claim 3 wherein said means providing an intermediate frequency signal includes:

means separating said simultaneous second carrier frequency upper and lower sideband signal reflections into discrete signals; and means mixing said discrete signals for providing an intermediate frequency equal to the frequency difference of said discrete signals.

5. A radar system as recited in claim 4 wherein said means for applying comprises:

heterodyning means receiving said intermediate frequency and providing an output at another intermediate frequency for said receiver and range tracker.

6. A radar system as recited in claim 4 wherein said means separating said reflected second carrier frequency upper and lower sideband signals comprises:

first and second filter means receiving said reflected signals and passing substantially unattenuated signals having a frequency within the bandpasses thereof; and mixer means combining said unattenuated signals and providing an intermediate frequency output signal only in the presence of simultaneous signals from said filter means.

7. A radar system as recited in claim 6 further comprising:

receiver means operatively connected to said mixer means for providing target range tracking information.

8. A radar system as recited in claim 1 wherein said means for combining said output signal with said second carrier frequency includes:

first and second mixer means receiving said selector output signal and said second carrier frequency and providing upper and lower sideband output signals thereof; and second and third selector means each selectively passing only one of said sideband output signals.

* * * * *